(12) United States Patent
Barr

(10) Patent No.: US 8,284,690 B2
(45) Date of Patent: Oct. 9, 2012

(54) RECEIVER DETERMINED PROBE

(75) Inventor: David Barr, San Jose, CA (US)

(73) Assignee: Entropic Communications, Inc., San Diego, CA (US)

( * ) Notice: Subject to any disclaimer, the term of this patent is extended or adjusted under 35 U.S.C. 154(b) by 253 days.

(21) Appl. No.: 12/635,649

(22) Filed: Dec. 10, 2009

(65) Prior Publication Data

US 2010/0150016 A1  Jun. 17, 2010

Related U.S. Application Data

(60) Provisional application No. 61/122,687, filed on Dec. 15, 2008, provisional application No. 61/179,454, filed on May 19, 2009.

(51) Int. Cl.
*G06F 11/00* (2006.01)
*G06F 15/173* (2006.01)

(52) U.S. Cl. ........................................ 370/252; 709/224

(58) Field of Classification Search .................. None
See application file for complete search history.

(56) References Cited

U.S. PATENT DOCUMENTS

| 7,124,199 B2 * | 10/2006 | Miller et al. ................... 709/238 |
| 2007/0183383 A1 * | 8/2007 | Bitran et al. ................... 370/338 |
| 2008/0117833 A1 * | 5/2008 | Borran et al. ................. 370/252 |

* cited by examiner

*Primary Examiner* — Clemence Han
(74) *Attorney, Agent, or Firm* — Bruce W. Greenhaus; Daniel Yannuzzi; Michael Febbo

(57) ABSTRACT

According to various embodiments of the disclosed method and apparatus, nodes on a network are programmed to generate a probe transmission in response to a request from the node that will be receiving the probe. The receiving node may generate a probe request that specifies a plurality of parameters, such as a modulation profile for the probe; the payload content of the probe; the number of times to transmit the probe; a number of symbols for the payload of the probe; a preamble type for the probe; a cyclic-prefix length for the payload of the probe; a transmit power for the probe; and a transmit power scaling factor for the payload of the probe.

24 Claims, 6 Drawing Sheets

RECEIVER DETERMINED PROBE

CROSS-REFERENCE TO RELATED APPLICATIONS

This application claims the benefit of U.S. Provisional Applications No. 61/122,687, filed Dec. 15, 2008, and No. 61/179,454, filed May 19, 2009, each of which is herein incorporated by reference.

TECHNICAL FIELD

The presently disclosed method and apparatus relates generally to communication networks, and more particularly, some embodiments relate to channel assessment probes.

DESCRIPTION OF THE RELATED ART

A home network may include multiple types of subscriber equipment configured to deliver subscriber services throughout the home. These subscriber services include delivering multimedia content, such as streaming audio and video, through the home network to subscriber equipment, where it is presented to a user. As the number of available subscriber services has increased and they become more popular, the number of devices being connected within each home network has also increased. The increase in the number of services and devices increases the complexity of coordinating communication between the network nodes as each node may experience different access conditions along its portion of the network.

This increase in complexity, further increases the likelihood that network problems may develop. When problems with subscriber services develop, subscriber service content providers are typically required to diagnosis the source of the network problem. Often, this requires sending a technician to the physical location of the home network to personally assess the network and diagnose the problem. Accordingly, as the number of homes with subscriber services incorporated into their home networks increases, so does the amount of resources a service provider must devote to technical support and network maintenance.

In many instances in which a network is established, it is helpful to characterize the communication channel over which data is to be sent between nodes of the network. It should be noted that for the purposes of this disclosure, a "channel" is the communication link between a first node of a network and a second node of a network in one particular direction. Therefore, there is a first channel from a first node 1 to a second node 2 and a second unique channel from the second node 2 to the first node 1. In some instances, probes are sent between nodes of the network in order to allow a receiving node on the network to determine some of the characteristics of the channel between the receiving node and the transmitting node. These probes are typically well defined. Accordingly, the receiving node knows before reception what reference signal was transmitted. By comparing the reference probe with the actual received probe, the receiver can determine some of the characteristics of the channel between the transmitting and receiving node. However, requiring the transmitting node to send a predetermined probe reduces the amount flexibility of the characterization process. Nonetheless, this reduction in the flexibility must be suffered because it is critical to the process that the receiving node knows the precise form of the transmitted probe.

BRIEF SUMMARY

According to various embodiments of the disclosed method and apparatus, nodes on a network (also referred to as network devices) are programmed to generate a probe transmission in response to a request from the nodes that will be receiving the probe. The receiving node may generate a probe request that specifies a plurality of parameters to be used in such a "receiver determined" probe to generate a probe having the "form" specified by these parameters. Accordingly, the probe request specifies a plurality of parameters associated with the generation and transmission of a probe, including the content of a payload of the probe. In one embodiment, the parameters further include: the modulation profile for the probe; the payload content of the probe; the number of times to transmit the probe; the number of symbols for the payload of the probe; the preamble type for the probe; the cyclic-prefix length for the payload of the probe; the transmit power for the probe; and the transmit power scaling factor for the payload of the probe. Accordingly, the probe that is transmitted in response to the probe request will have a form dictated by the parameters specified in the probe request.

In various embodiments, these receiver determined probes may be used in a variety of applications. For example, the probes may be used to reach or discover hidden nodes; in networks employing orthogonal frequency division multiple access (OFDMA), the probes may be used for OFDMA subchannel assessment; or in networks accessible by content providers, the probes may be used for off-site network diagnosis.

An embodiment of the disclosed method comprises: a) receiving in a first node, a probe request specifying a plurality of parameters associated with the generation and transmission of a probe, including the content of a payload of the probe; and b) transmitting from the first node to a second node the probe having a form dictated by the parameters specified by the probe request.

In a further embodiment of the method and apparatus, at least one of the probe parameters indicates: a) a modulation profile for the probe; b) the payload content of the probe; c) the number of times to transmit the probe; d) the number of symbols for the payload of the probe; e) the preamble type for the probe; f) the cyclic-prefix length for the payload of the probe; g) the transmit power for the probe; and h) the transmit power scaling factor for the payload of the probe.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the claimed invention, which is defined solely by the claims attached hereto.

BRIEF DESCRIPTION OF THE DRAWINGS

The disclosed method and apparatus, in accordance with one or more various embodiments, is described in detail with reference to the following figures. The drawings are provided for purposes of illustration only and merely depict either typical embodiments or examples of particular embodiments. These drawings are provided to facilitate the reader's understanding of the disclosed method and apparatus and shall not be considered limiting of the breadth, scope, or applicability of the claimed invention. It should be noted that for clarity and ease of illustration these drawings are not necessarily made to scale.

Figure 1:
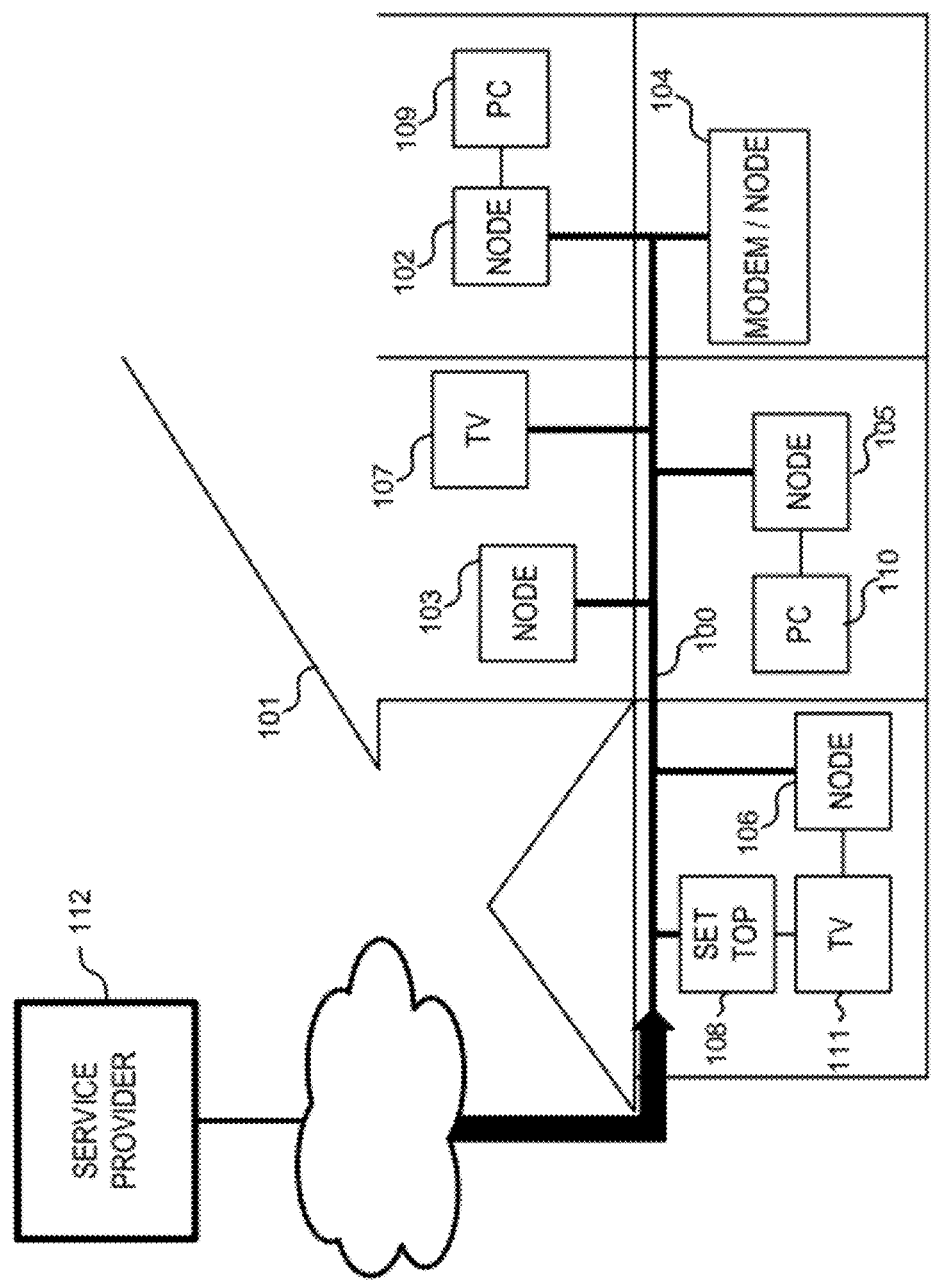
FIG. 1 illustrates an example of one environment in which some embodiments of the disclosed method and apparatus may be implemented.

The figures are not intended to be exhaustive or to limit the claimed invention to the precise form disclosed. It should be understood that the disclosed method and apparatus can be practiced with modification and alteration, and that the claimed invention should be limited only by the claims and the equivalents thereof.

DETAILED DESCRIPTION

Before describing the disclosed method and apparatus in detail, it is useful to describe an example of an environment in which the disclosed method and apparatus can be implemented. The network of FIG. 1 will be described for this purpose. A wired communications medium 100 is shown. In some embodiments, the wired communications medium might be a coaxial cable system, a power line system, a fiber optic cable system, an Ethernet cable system, or other similar communications medium. Alternatively, the communications medium might be a wireless transmission system. In the illustrated embodiment, the communications medium 100 is preinstalled coaxial cabling deployed within a residence 101.

The network comprises a plurality of network nodes 102, 103, 104, 105, 106 in communication according to a communications protocol. For example, the communications protocol might comprise a networking standard, such as the Multimedia over Coax Alliance (MoCA) standard. In the illustrated embodiment, the communications protocol specifies a packet based communications system. In this embodiment, physical layer (PHY) packets comprise preambles and payloads. A PHY preamble is typically inserted at the beginning of each packet to assist receivers in detecting and acquiring the physical layer parameters to properly receive and decode the packet. The communications protocol may have a plurality of pre-defined PHY preambles to use with different types of network communications. For example, one type of preamble may be used when transmitting in a diversity mode (a communication mode in which little is known about the communication channel). Another type of preamble may be used when transmitting a media access plan (MAP) message. Another type of preamble may comprise a specified subset of subcarrier frequencies. Other types of packets may use other types of preambles.

A PHY payload is used to transmit the data content of the packet. In some cases, the PHY payload has a predetermined format. For example, in a MoCA network, network maintenance messages and MAP messages each have a format that is determined by the MoCA protocol. In other cases, the PHY payload may have undetermined format. For example, the PHY payload of a media streaming transmission might comprise an embedded Ethernet packet or a portion thereof.

In some embodiments, activity on the network is controlled by a network coordinator (NC) node. In one such embodiment, one of the nodes is selected to perform the functions of the NC based upon a process defined by the communications protocol. In networks employing an NC, the NC schedules network communications between network nodes using a MAP message. The MAP is sent as a packet. Such MAP packets are sent on a regular basis. MAPs are generated in response to reservation requests by the nodes of the network. The NC's MAP message may precisely schedule probe transmissions. The NC also performs admission procedures when a new node requests admission to the network.

Nodes described herein can be associated with a variety of devices. For example, in a system deployed in a residence 101, a node may be a network communications module associated with one of the computers 109 or 110. Such nodes allow the computers 109, 110 to communicate on the communications medium 100. Alternatively, a node may be a module associated with a television 111 to allow the television to receive and display media streamed from the internet, or from one or more other network nodes. A node might also be associated with a speaker or other media playing devices 103 that plays music. A node might also be associated with a module configured to interface with an internet or cable service provider 112, for example to provide Internet access, digital video recording capabilities, media streaming functions, or network management services to the residence 101.

In many embodiments, network probes are used to perform various channel assessment or network maintenance procedures. For example, in a wired network, network node mobility may be fairly low and new nodes joining the network may be a relatively rare occurrence. In contrast to highly dynamic networks, such as wireless networks, wired networks are more stable, i.e., the channel conditions do not change frequently. In stable networks probing can be used to profile the channel conditions without introducing unacceptable network overhead. However, even with more dynamic networks, network probes can be used to diagnose problems. For example, a probe can replicate a potential problem, reach or discover a distant or previously undetected node on the network, or assist with network admissions procedures.

In some embodiments, network communications use orthogonal frequency division multiplexing (OFDM). In OFDM, a communications channel comprises a plurality of orthogonal subcarrier frequencies. In one embodiment, transmissions are modulated onto these subcarriers using quadrature amplitude modulation (QAM), where symbols are modulated onto the subcarrier by modifying the amplitude of an in-phase and independently modifying the amplitude of a quadrature portion of the subcarrier transmission. Each OFDM symbol is formed from the collection of all of the QAM symbols modulated onto each of the used subcarriers in the same time slot. In some embodiments, each subcarrier is modulated with the same modulation scheme. For example, an OFDM symbol may comprise a plurality of subcarriers each modulated with 4-QAM. In another embodiment, transmissions on different subcarriers may utilize different QAM schemes. For example, a first subcarrier may be modulated using 2-QAM (otherwise known as binary phase shift keying (BPSK)), a second subcarrier may be modulated using 64-QAM, and so on. In yet another embodiment, different transmission types may utilize different types of OFDM symbols. For example, during network admissions processes, transmissions may utilize OFDM symbols where each subcarrier is modulated with 2-QAM, and once the network node has been admitted to the network, it may utilize an adaptable bitloading profile for its OFDM symbols.

In some embodiments, OFDMA may be employed to allow multiple nodes to have simultaneous access to the channel. In OFDMA, disjoint subsets of subcarriers, referred to as sub-channels, are assigned to the nodes participating in the OFDMA communications. In some embodiments employing NCs, OFDMA is used for the communications between the non-NC nodes and the NC. In these embodiments, the NC may partition the channel into sub-channels and assign these sub-channels to the participating network nodes. In a particular embodiment, the sub-channels are configured such that the bitloading on each sub-channel is the same. In this embodiment, because different subcarriers may accommodate different modulation schemes, the sub-channels may not all have the same number of subcarriers. However, in other embodiments, different sub-channel bitloading and partitioning schemes may be employed.

Figure 2:
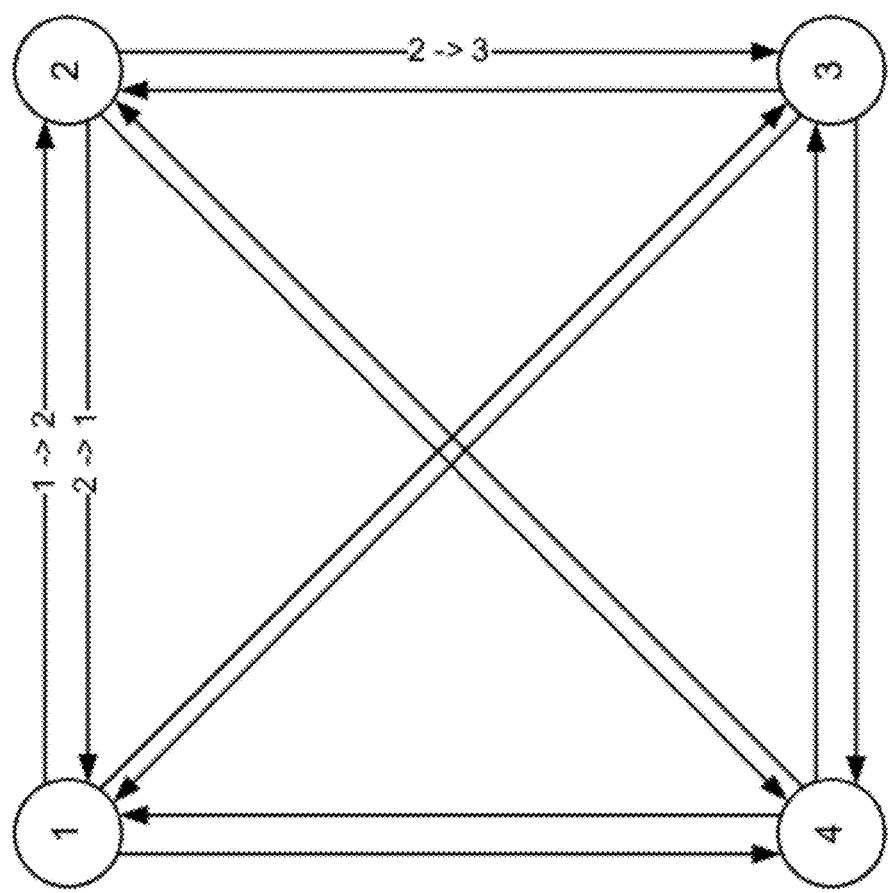
FIG. 2 illustrates an example of one embodiment of a network topology of the disclosed method and apparatus.

FIG. 2 illustrates a full mesh topology between four example nodes. In some embodiments, network conditions may vary according to the particular channel, and even according to the direction of the channel. For example, network conditions for the channel from node 1 to node 2 can differ from the conditions for the channel from node 2 to node 1. These can each be different from the conditions of the channel from node 2 to node 3, and so on. Accordingly, different modulation schemes may be employed for each channel. In one embodiment, probes are used during a network profiling period to determine the modulation schemes to be used for the different links. For example, node 1 may transmit a probe request to each of nodes 2, 3, and 4 specifying a bitloading per subcarrier and a raw data sequence to be used in transmitting the probe. Each of nodes 2, 3, and 4 would then generate the probe with the requested bitloading and raw data sequence and transmit the probe to node 1. By analyzing this return probe and repeating the process if necessary, node 1 can develop bitloading profiles for use on the subcarriers used to communicate with each of nodes 2, 3, and 4.

In one embodiment employing OFDMA, a receiving node sends a probe request that indicates which sub-carriers are to be used to send a probe from a particular transmitting node and the bitloading profiles applied across those sub-carriers. For example, in one embodiment, node 1 may be an NC, and may receive reservation requests from nodes 2, 3, and 4 simultaneously using OFDMA. If node 1 were to establish a potential sub-channel with node 2, node 1 can transmit a probe request specifying a bitloading profile in which the subcarriers that are not in the potential sub-channel are left untransmitted. Accordingly, the bitloading profile would indicate modulating only the subcarriers that are in the potential sub-channel. In this case, the probe generated by node 2 in response to the probe request from node 1 would emulate an OFDMA transmission from node 2 to node 1. Node 1 could then use the information derived from the probe in its OFDMA sub-channel allocation procedure.

In another embodiment, node 1 could transmit one or more probe requests that request probes to be transmitted by some or all of the OFDMA participant nodes simultaneously on the subcarriers assigned to be used by each OFDMA participant node.

Figure 3:
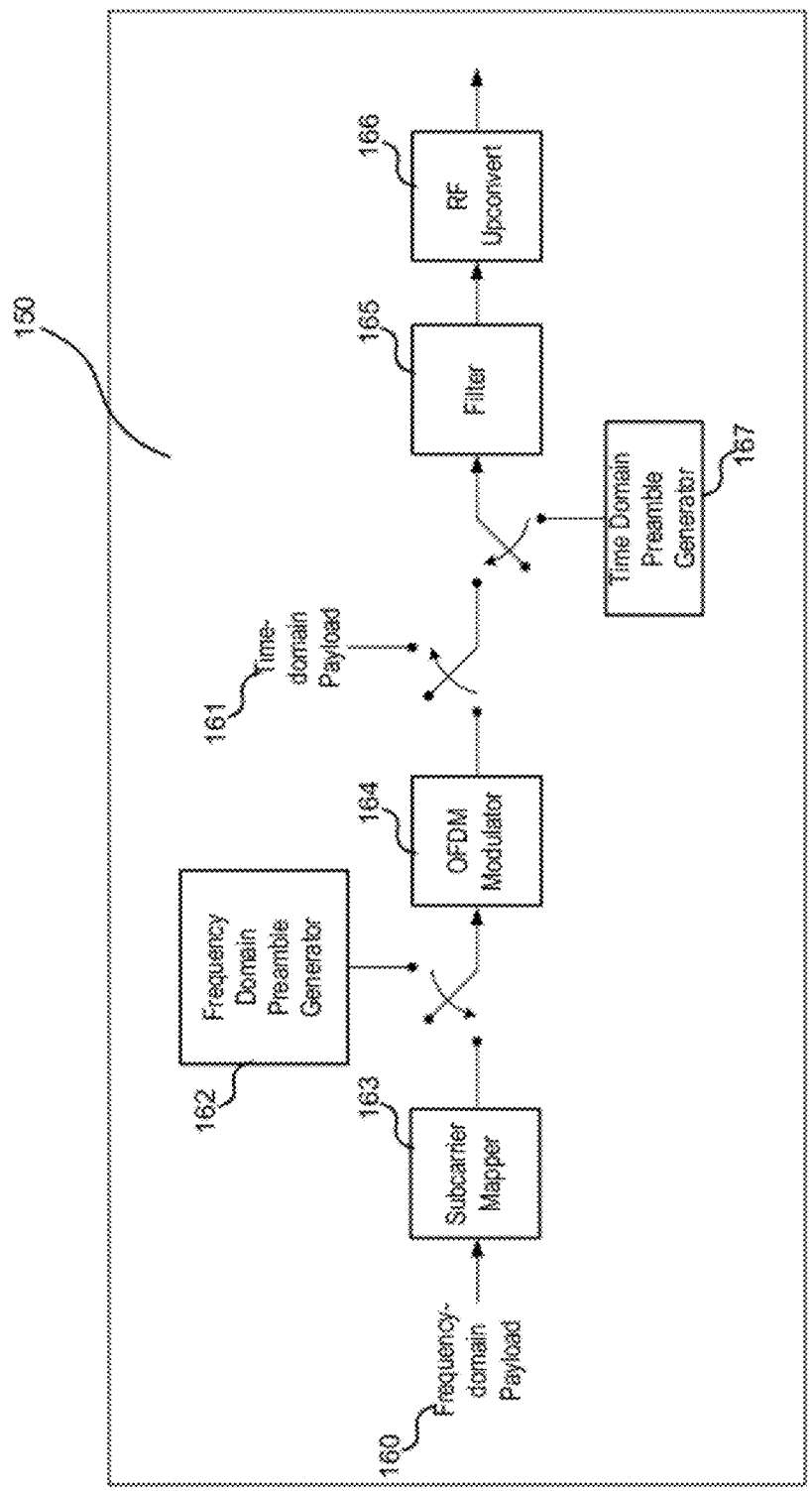
FIG. 3 illustrates a transmitter module that may be employed in some embodiments of the disclosed method and apparatus to generate PHY packets.

FIG. 3 illustrates a transmitter module 150 used within a node, such as the nodes 102, 103, 104, 105, 106 shown in FIG. 1. The transmitter module 150 generates PHY packets in accordance with one embodiment of the disclosed method and apparatus. The module 150 has a frequency domain payload 160 and/or a time domain payload 161. A subcarrier mapper 163 maps the payload 161 to a plurality of assigned subcarriers according to a predetermined bitloading profile for the channel (or sub-channel in the case of an OFDMA transmission). The transmitter module 150 uses a frequency domain preamble generator module 162 to insert a frequency domain PHY preamble before the frequency domain payload 160. Accordingly, a preamble specified in the frequency domain may be "prepended" to the payload after the subcarrier mapper 163. The combined signal is then modulated onto the OFDM symbol by a modulator module 164. The modulated signal is then filtered and upconverted to the channel's predetermined radio frequencies by the filter 165 and an RF upconverter 166.

When the transmitting module 150 is generating a time domain packet, the frequency domain modulation is not necessary. However, in one embodiment the frequency domain modulation is used even when generating a time domain packet. A time domain payload 161 having a time domain preamble generated by a time domain preamble generator module 167 is filtered and RF upconverted for transmission on the channel.

Figure 4:
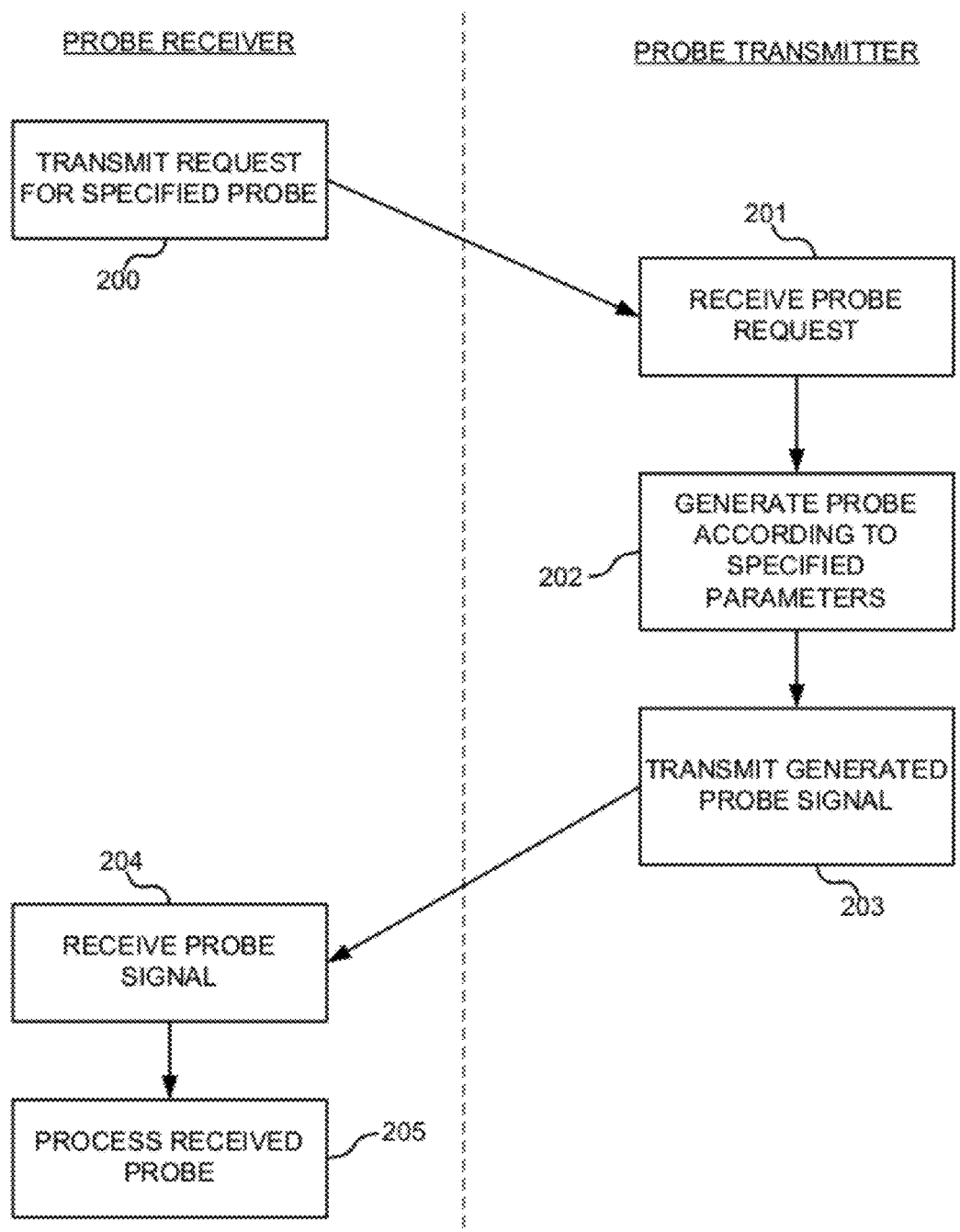
FIG. 4 illustrates a method of operation according to an embodiment of the disclosed method and apparatus.

FIG. 4 illustrates a method of operation according to an embodiment of the disclosed method and apparatus. In block 200, one or more nodes transmit a probe request specifying probe parameters to one or more nodes that will be transmitting the eventual probe(s) having a form that is dictated by the specified parameters. In one embodiment, the probe is transmitted by a single node and received by a single node (point-to-point) or received by several nodes (point-to-multipoint, such as multicast or broadcast). In another embodiment, the probe is simultaneously transmitted by multiple nodes and received by a single node (multipoint-to-point, such as OFDMA). In other OFMDA embodiments, multiple nodes might share the communications channel for multi-point to multi-point communications. In such a case, multiple nodes can transmit probe requests, and multiple nodes can receive probes, all simultaneously.

In block 201, the probe transmitter or transmitters receive the probe request or requests. In one embodiment, the probe request specifies a plurality of parameters for the probe that will dictate the form of the probe to be transmitted. These parameters are discussed in more detail below with respect to FIG. 5. In block 202, the probe transmitter uses the specified probe parameters to generate a probe having a form that complies with the specified parameters. In block 203, the probe transmitter transmits the generated probe to the probe requester at a specified time. Alternatively, the probe transmitter can transmit the probe to any other probe base upon one of the parameters of the probe request or based upon information that previously existed within the transmitting node. In some embodiments, the requested probe may exceed certain capabilities of the transmitter.

In one embodiment, the probe transmitter's RMS error (signal fidelity) requirements may be relaxed if the requested probe specifies a power output that exceeds the transmitting node's nominal total output power. As another example, the probe transmitter may have restrictions on how many time domain probes it is allowed to send, and will send a time domain probe only if the probe transmitter determines that the time domain probe will not negatively impact other network operations.

In block 204, the requesting node receives the probe generated according to its earlier probe request. The received probe may then be used in further processing in block 205. In one embodiment, the received probe may be used in channel analysis to determine a bitloading table, FEC and other communication parameters for OFDM or OFDMA signals for future transmissions from the probe transmitter. In another embodiment, post reception processing might comprise generating a report from the probe and transmitting this probe report to the requesting node or to a designated entity. For example, the probe report could contain bitloading, FEC and other communication parameters to be used subsequently by the transmitting node when communicating to the receiving node. In another example, the probe report could be conveyed to an offsite network administrator for remote management purposes. For example, the parameters of the requested probe can be determined by an off-site network administrator, and conveyed to a probe requestor. The resulting probe, post-processing, and probe report can be used to assist in diagnosing a network problem possibly involving the probe requester or the probe transmitter. In one such case, a probe report is sent to the network administrator.

In other embodiments, the probe request might be transmitted by a different node than the probe receiver. For example, in FIG. 2, node 2 might generate a probe request for node 3 to generate and transmit a specified probe to node 1. In some embodiments, this is used to determine how communications between node 3 and node 1 could impact communications between node 2 and node 4. This might occur, for example, in an OFDMA system in which a sub-channel between node 1 and node 3 and a second sub-channel between node 2 and node 3 are active at the same time. In another embodiment, an NC can generate a probe request for a probe to be transmitted between two other nodes with an instruction that a probe report be transmitted to the NC. This might be used by an off-site network manager that can communicate with only some of the network nodes, but suspects that communications between other network nodes may be causing a network problem.

Figure 5:
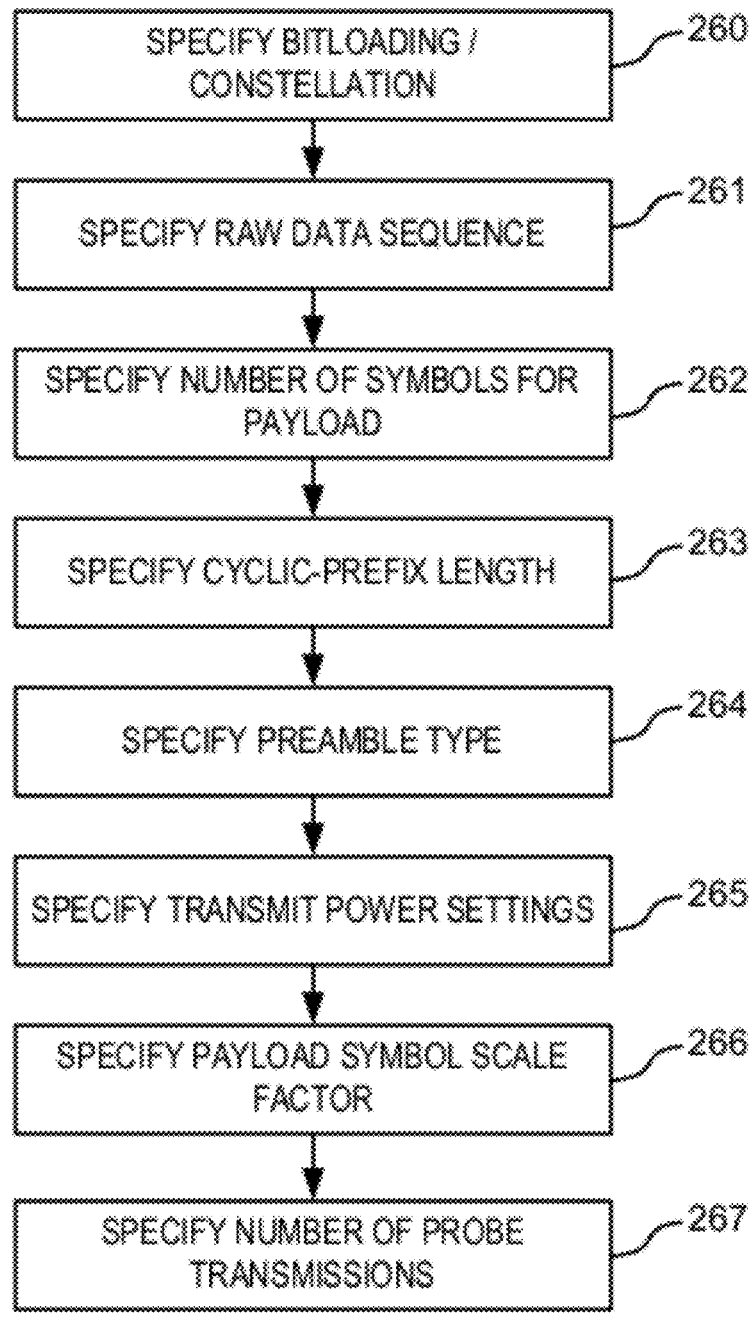
FIG. 5 illustrates examples of parameters that may be modified or determined for generating a probe request according to an embodiment of the disclosed method and apparatus.

FIG. 5 illustrates examples of parameters that may be modified or determined for generating a probe request according to an embodiment of the disclosed method and apparatus. A probe request may specify a bitloading profile or constellation profile to be used in the probe (block 260). For example, in OFDM networks, the bitloading profile or constellation profile may specify which QAM constellations to use for which channel subcarriers. In some embodiments, the specified bitloading profile may specify a QAM constellation or QAM scheme to use for each subcarrier. In other embodiments, the bitloading profile specifies QAM schemes for only a subset of the available subcarriers and the probe generating node will not transmit the remaining subcarriers.

In various embodiments, the bitloading profile includes indications to leave certain subcarriers untransmitted. For example, in one embodiment, in which the network conforms to an industry standard established by MoCA, 100 MHz/512 versions of MoCA's Type II Frequency Domain Tone Probes can be accommodated without the need to specifically define the probes in the MoCA specification. This could be accomplished in part by generating a probe request for a probe having two modulated subcarriers, while specifying that the remaining subcarriers of the probe be untransmitted. As another example, an OFDMA transmission from a single node could be emulated by instructing the node to transmit a probe in which only subcarriers belonging to a certain sub-channel are transmitted, while leaving the remaining subcarriers untransmitted. Additionally, simultaneous OFDMA transmissions may occur in response to probe requests to multiple nodes. In one embodiment, each of the multiple probe requests is sent to one of a plurality of nodes. Each probe request specifies a bitloading profile specific to the particular probe-transmitting node, such that the simultaneously transmitted probes from the multiple nodes comprise an OFDMA transmission to the requesting node.

In accordance with the embodiment shown in FIG. 5, in block 261, the probe request specifies a raw data sequence for the probe (or for just the probe's payload). In some embodiments, a network communications protocol specifies that various techniques, such as data-scrambling, bin-scrambling, forward error correction, or encryption be used in network communications. In some such embodiments, these techniques are specified in the probe request. In alternative embodiments, these techniques are not used in the specified data sequence for simplicity.

In block 262, a probe request specifies a number of symbols for the probe payload length. In one embodiment, the number of symbols and the raw data sequence will be determined such that the serialized bit stream corresponding to the raw data sequence fully occupies the requested number of symbols using the requested bitloading profile. Additionally, in embodiments using OFDM communications, or other embodiments with multi-path channel characteristics, a cyclic prefix length may be specified. In some embodiments, the cyclic prefix length may be the same for each symbol of the specified number of symbols. In other embodiments, the cyclic prefix length may be assigned in a symbol specific manner or may otherwise vary between symbols of the probe.

In block 264, a probe request further specifies a preamble type to use in the probe. As discussed above, some networks operate according to protocols that specify a variety of available packet preambles. These packet preambles can be used for packet identification or can contain information useful in receiving and decoding the packet's payload. In some embodiments, different preambles may be utilized according to channel conditions, such as a long and robust preamble when the channel conditions are unknown, or a short and efficient preamble when the channel conditions are known to be good. In some embodiments using OFDMA transmissions, a preamble type may be used in which each simultaneous transmitter contributes a portion of the composite preamble corresponding to the particular subcarriers assigned to each participating transmitter. In some embodiments, nodes may be restricted from using certain preamble types. For example, in a network utilizing MAP packets, a MAP packet preamble may be specified, and nodes may be restricted from requesting that a probe utilize a MAP packet preamble. This can serve to reduce the likelihood that a probe might adversely affect the operation of other nodes not involved in the probing procedure. In other embodiments, the type of preamble available is not restricted, or the restriction can be overcome in certain circumstances. For example, diagnostic probe requests could be unrestricted in terms of the available preambles while network maintenance or assessment or channel assessment probe requests could be restricted in terms of their available preambles. Additionally, in some embodiments, only certain probe parameters can be requested under certain conditions. For example, in an OFDMA network, the network protocol may specify that a particular OFDMA preamble be used in all OFDMA transmissions. Therefore, if a probe request specifies an OFDMA probe, then the probe request will specify that the particular OFDMA preamble be used in the OFDMA probe. In another embodiment, the probe request also specifies that the same subcarriers remain untransmitted in the preamble as in the OFDMA packet payload. In another embodiment, the probe transmitting node may perform this operation automatically.

In the embodiment of FIG. 5, block 265 indicates that a probe request specifies a transmit power setting for the probe. In some embodiments, the network protocol may establish a range of transmit power settings that are available for various transmissions. In a particular embodiment, a range of transmit power (attenuation) settings is between 0 and 30 dB for normal transmissions, and between −12 dB (corresponding to amplification) to 45 dB for OFDMA transmissions, or transmissions with an OFDMA specifying preamble. In some embodiments, a node conforms to these predetermined settings in generating probe requests. In other embodiments, the different settings available for different transmission types may be exploited to generate particular probes. For example, a probe request could request an amplified non-OFDMA probe in order to reach or identify a distant or hidden node.

In block 266, a probe request further specifies a power scaling factor for the payload relative to the preamble. In embodiments employing this scaling factor, probe payloads can be transmitted with different power characteristics than the probe preambles. In one particular embodiment, the scale factor varies from 0 to 17 dB of amplification in the payload relative to the preamble. This might be used in a variety of different requested probes. For example, 100 MHz/512-subcarrier versions of MoCA's Type II Frequency Domain Tone Probes can be emulated, in part, by applying an appropriate payload scale factor. For example, a probe request may specify a payload that modulates only a single subcarrier with the maximum available payload scaling factor (amplification) in order to reach or identify a distant or hidden node. In another example, a payload scale factor may be requested which produces a probe transmission which exceeds the transmitting node's nominal total output power, in order to reach or identify a distant or hidden node. Alternatively, the probe request may specify an OFDMA emulating probe in which the payload is modulated on a set of subcarriers that comprises a potential sub-channel for OFDMA communications. The scaling factor can be determined such that the payload is transmitted at the power level of a normal OFDMA sub-channel, even though the preamble does not specify that the communication is an OFDMA sub-channel. In one embodiment, such probes might be used to assess a channel and thus allow an NC to pre-determine which OFDMA sub-channels should be used if a node leaves or joins the network. For example, an NC could establish four potential sub-channels for a network having three current nodes. This would avoid overhead if a fourth node were to join the network. In some embodiments, packet power restrictions may impact what scaling factors are available in terms of the specified transmit power setting. In a particular embodiment, the payload symbol scaling factor minus the transmit power (attenuation) setting is restricted to less than or equal to 12 dB.

In block 267, a probe request specifies the number of times the generated probe should be transmitted. For example, a probe request may specify that the generated probe be repeated to allow improved channel assessment or to diagnosis a particular network issue. In one embodiment, the amount of delay between repetitions is specified. In further embodiments, the probe request may specify that certain probe parameters vary in subsequent transmissions. For example, the probe request may specify that the transmitter transmit three subsequent probes with equivalent parameters except for an increasing power transmit setting. In some embodiments, this is used to avoid repetitious probe requests.

In some alternative embodiments, the probe requests specify time-domain probes. For example, a probe request may specify a time domain probe to generate a square wave or other easily analyzed signal for channel estimate purposes. In some embodiments, factors similar to those employed in the embodiments described with respect to FIG. 5 may be employed in a time domain probe request, except that the bitloading profile and raw data bit-sequence are replaced with a time series for the transmitted probe. In some embodiments, the allowed time domain sequences are restricted, for example to prevent a mal-formed packet from disrupting other network communications. In other embodiments, probe transmitters are programmed to evaluate a received time-domain probe request to determine if the corresponding time-domain probe would disrupt the network.

In various embodiments, allowing a probe receiving node to specify the parameters for a probe from the probe transmitting node allows various features to be implemented. Furthermore, in some embodiments, networks implementing these embodiments may simplify their shared communications standards. For example, a network standard may forgo specifying particular assessment probes and allow a receiving node to determine its own assessment probe. In one embodiment, the receiving node may utilize this ability to specify the characteristics of an error vector measurement (EVM) probe or echo profile probe (EPP). Furthermore, this may simplify the shared communications standard by allowing proprietary aspects of the probe signal processing to be confined to particular receivers. Allowing the receiving node to specify the characteristics of the probe also supports future extensibility (e.g., new probe signals could be supported by older transmitters). In addition to allowing a network to improve its functioning, this may also allow legacy nodes to better interoperate with nodes operating according to future standards. For example, if an improved EVM probe type were developed for a future network, nodes implementing this embodiment will be capable of transmitting the improved probe, even if they themselves are not able to process these probes and are restricted to using a legacy EVM probe. Additionally, some nodes may be capable of downloading or receiving new probe types from outside entities. In networks implementing an embodiment of the disclosed method and apparatus, these new probes may be uploaded to the capable nodes, which can then request the updated probes to be transmitted from nodes that would not otherwise have the upgraded capabilities.

Figure 6:
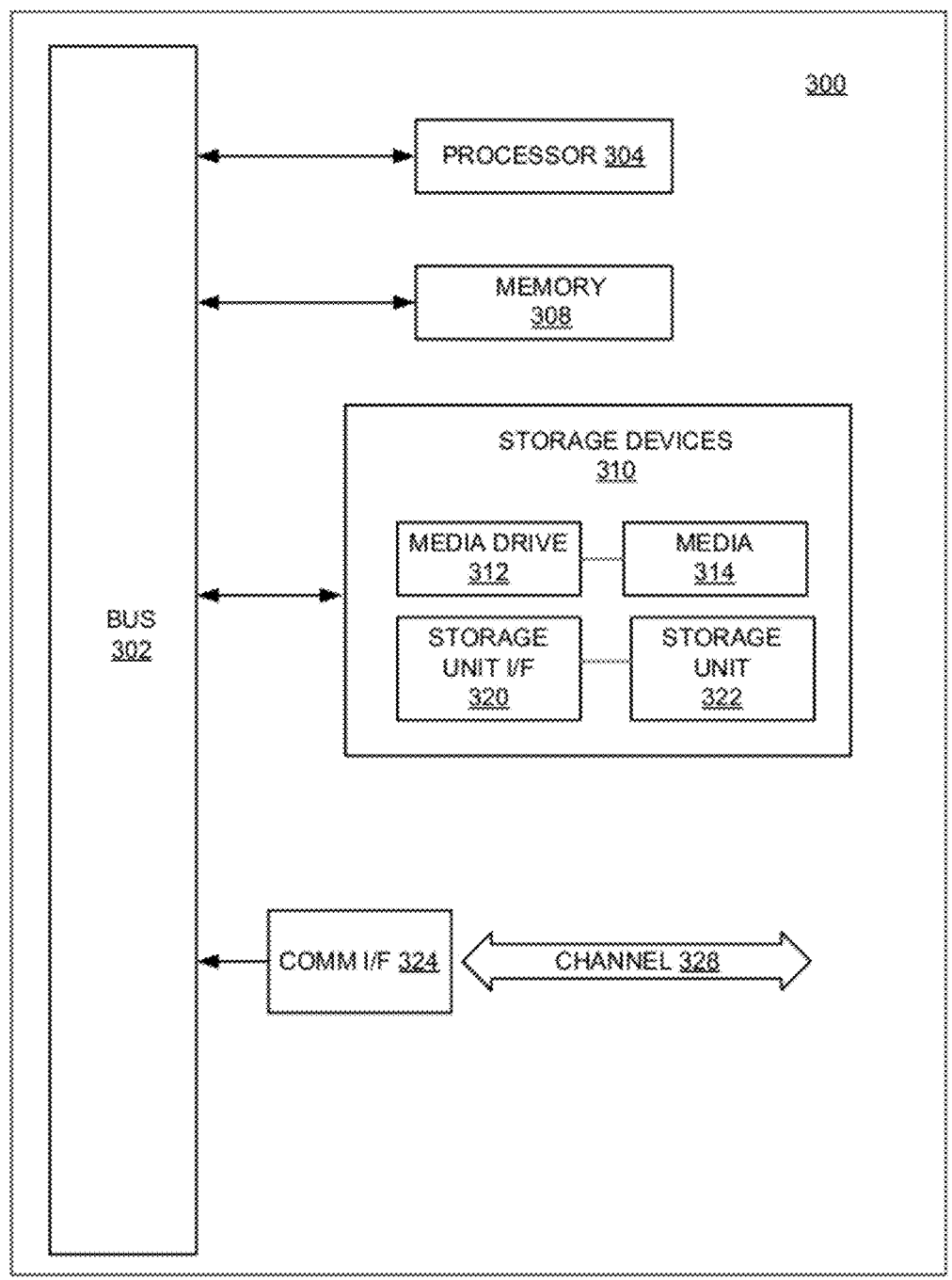
FIG. 6 illustrates an example computing module that may be used in implementing various features of embodiments of the disclosed method and apparatus.

As used herein, the term module might describe a given unit of functionality that can be performed in accordance with one or more embodiments of the disclosed method and apparatus. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the disclosed method and apparatus are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 300. After reading this description, it will become apparent to a person skilled in the relevant art how to implement the disclosed method and apparatus using other computing modules or architectures.

Referring now to FIG. 6, computing module 300 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 300 might also represent computing capabilities embedded within or otherwise available to a given device. For example, a computing module 300 might be found in electronic devices such as, for example, digital cameras, navigation systems, cellular telephones, portable computing devices, modems, routers, wireless access points (WAPs), terminals and other electronic devices that might include some form of processing capability.

Computing module 300 might include, for example, one or more processors, controllers, control modules, or other processing devices, such as a processor 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing module 300 or to communicate externally.

Computing module 300 might also include one or more memory modules, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 302 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a floppy disk drive, a magnetic tape drive, an optical disk drive, a CD or DVD drive (R or RW), or other removable or fixed media drive might be provided. Accordingly, storage media 314 might include, for example, a hard disk, a floppy disk, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory module) and memory slot, a PCMCIA slot and card, and other fixed or removable storage units 322 and interfaces 320 that allow software and data to be transferred from the storage unit 322 to computing module 300.

Computing module 300 might also include a communications interface 324. Communications interface 324 might be used to allow software and data to be transferred between computing module 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a MoCA channel over coaxial cable, phone line, power line, a cellular link, an RF link, an optical link, a network interface, a local or wide area network, and other wired or wireless communications channels.

In this document, the terms "computer program medium" and "computer usable medium" are used to generally refer to media such as, for example, memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 300 to perform features or functions of the disclosed method and apparatus as discussed herein.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the blocks are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described embodiments which are presented as mere examples for illustration only.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method comprising:
   a) receiving in a first node, a probe request specifying a first plurality of parameters associated with the generation and transmission of a probe, wherein the first plurality of parameters at least specify content payload of the probe and a second node;
   b) determining a second plurality of parameters associated with generation and transmission of the probe;
   c) generating the probe in accordance with the first plurality of parameters and the second plurality of parameters, wherein the probe has a form dictated by the first plurality of parameters; and
   d) transmitting the probe from the first node to the second node.

2. The method of claim 1, further including using within the first node, at least one of the probe parameters to determine a modulation profile for the probe.

3. The method of claim 1, wherein at least one of the probe parameters indicates:
   a) a modulation profile for the probe;
   b) the number of times to transmit the probe;
   c) a number of symbols for the payload of the probe;
   d) a preamble type for the probe;
   e) a cyclic-prefix length for the payload of the probe;
   f) a transmit power for the probe; and
   g) a transmit power scaling factor for the payload of the probe.

4. The method of claim 3, wherein the probe request identifies a hidden node.

5. The method of claim 3, wherein the modulation profile for the probe emulates an orthogonal frequency division multiple access (OFDMA) transmission.

6. The method of claim 1, wherein the probe request is generated by the second node.

7. The method of claim 1, wherein the probe request requests a probe that assists in diagnosing a network problem.

8. The method of claim 7, wherein the probe request is generated by a network operator and uploaded to the second node.

9. A method comprising:
   a) a first node transmitting a probe request to a second node, the probe request specifying a first plurality of probe parameters for a physical layer probe, the first plurality of probe parameters comprising a form for the probe including a modulation profile for the probe;
   b) the first node receiving the probe from the second node, wherein the probe is generated in accordance with the first plurality of parameters and in accordance with a second plurality of parameters determined by the second node.

10. The method of claim 9, wherein the probe request is configured such that the probe emulates an OFDMA transmission.

11. The method of claim 9, further comprising:
    a) the first node transmitting a second probe request to a third node;
    b) and the first node receiving a second probe from the third node, wherein the second probe is generated according to the second probe request; and
    wherein the first probe and second probe are transmitted simultaneously using OFDMA.

12. The method of claim 9, wherein the probe parameters further comprises:
    a) an indication of the number of times to transmit the probe;
    b) a number of symbols for the payload of the probe; a preamble type for the probe;
    c) a cyclic-prefix length for the payload of the probe; a transmit power for the probe; and
    d) a transmit power scaling factor for the payload of the probe.

13. The method of claim 12, wherein the probe request is configured such that the probe identifies a hidden node.

14. The method of claim 9, wherein the probe request is transmitted at a specific time.

15. The method of claim 9, wherein the probe request is configured to diagnose a network problem.

16. The method of claim 15, wherein the probe request is generated by a network operator and uploaded to the first node.

17. A system, comprising:
    a) a first node on a communications network, the first node comprising a first processor and a first computer executable program code embodied on a first a computer readable medium, the first computer executable program code configured to transmit a probe request to a second node, on the communications network, the probe request specifying a first plurality of probe parameters for a physical layer probe, wherein the first plurality of probe parameters comprising at least a payload content for the probe and a modulation profile for the probe; and b) the second node on the communications network, the second node comprising a second processor and a second computer executable program code embodied on a second computer readable medium, the second executable program code configured to:

receive the probe request;

determine a second plurality of parameters associated with generation and transmission of the probe;

generate the probe in accordance with the first plurality of parameters and the second plurality of parameters, wherein the probe has a form dictated by the first plurality of parameters; and transmit the probe to the first node.

18. The system of claim 17, wherein the probe request is configured such that the probe emulates an OFDMA transmission.

19. The system of claim 17, wherein the first executable program code is further configured to transmit a second probe request to a third node on the communications network, the second probe request specifying a third first plurality of probe parameters for a second physical layer probe, the third plurality of probe parameters comprising a second payload content for the second probe and a second modulation profile for the probe, the second probe request further specifying a different second plurality of parameters associated with the generation and transmission of the second probe; and further comprising the third node on the communications network, the third node comprising a third processor and a third computer executable program code embodied on a third computer readable medium, the third executable program code configured to receive the second probe request, generate the second probe according to the received probe request, and transmit the second probe to the first node on the communications network; and wherein the first probe and second probe are transmitted simultaneously using OFDMA.

20. The system of claim 17, wherein the probe parameters further comprises:

a) an indication of the number of times to transmit the probe;

b) a number of symbols for the payload of the probe;

c) a preamble type for the probe;

d) a cyclic-prefix length for the payload of the probe;

e) a transmit power for the probe; and f) a transmit power scaling factor for the payload of the probe.

21. The system of claim 20, wherein the probe request is configured such that the probe identifies a hidden node.

22. The system of claim 17, wherein the probe request is generated by the first node.

23. The system of claim 17, wherein the probe request is configured to diagnose a network problem.

24. The system of claim 23, wherein the probe request is generated by a network operator and uploaded to the first node.

\* \* \* \* \*